United States Patent

[11] 3,604,579

| [72] | Inventor | Roy A. Jenkins |
| | | 165 N. 28th St., Springfield, Oreg. 97477 |
| [21] | Appl. No. | 875,320 |
| [22] | Filed | Nov. 10, 1969 |
| [45] | Patented | Sept. 14, 1971 |

[54] TRAILER FOR SNOW VEHICLES
10 Claims, 7 Drawing Figs.

| [52] | U.S. Cl. | 214/505 |
| [51] | Int. Cl. | B60p 1/28 |
| [50] | Field of Search | 214/501, 505, 83.24 |

[56] References Cited
UNITED STATES PATENTS

| 2,624,484 | 1/1953 | Dalton | 214/505 X |
| 2,977,011 | 3/1961 | Okerlund | 214/505 |
| 3,058,608 | 10/1962 | Lewis | 214/505 |
| 3,458,074 | 7/1969 | Railey | 214/505 |

FOREIGN PATENTS

| 705,916 | 3/1954 | Great Britain | 214/505 |
| 723,408 | 2/1955 | Great Britain | 214/505 |

*Primary Examiner*—Albert J. Makay
*Attorney*—James D. Givnan, Jr.

ABSTRACT: A trailer having a tiltable and rotatable bed for convenient loading and discharge of a load which for example may be snowmobiles as shown. A turntable supports the bed with the turntable being mounted particulate a tiltable framework movable relative to the trailer frame. A winch arrangement moves the trailer bed and tilting framework into and out of an inclined position incident to loading of the trailer. Bed retention means locks the bed to the trailer framework for travel means locks the bed to the tiltable for travel of the loaded trailer.

PATENTED SEP 14 1971 3,604,579
SHEET 1 OF 2
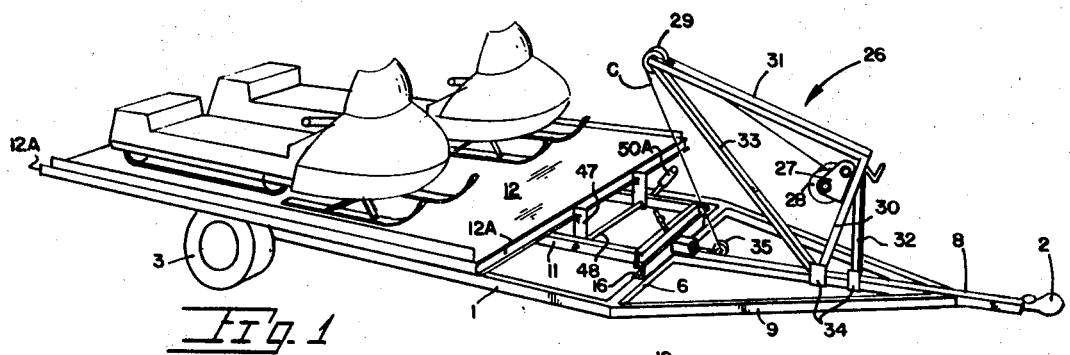
Fig. 1
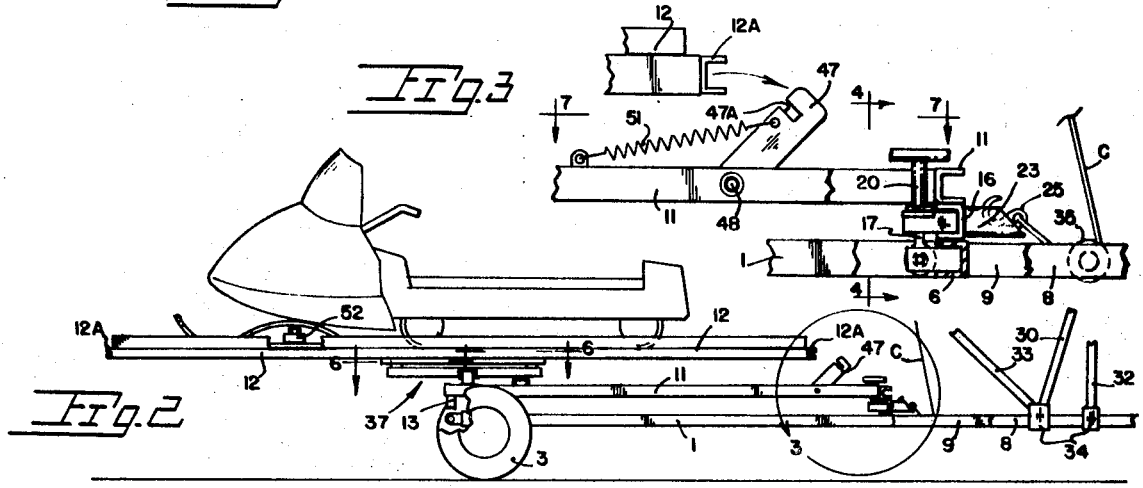
Fig. 3
Fig. 2
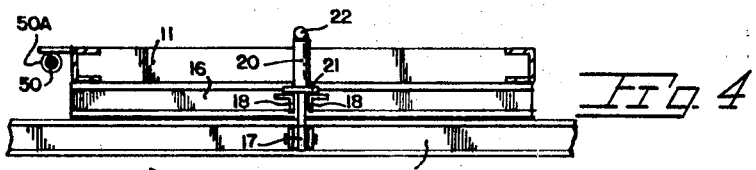
Fig. 4
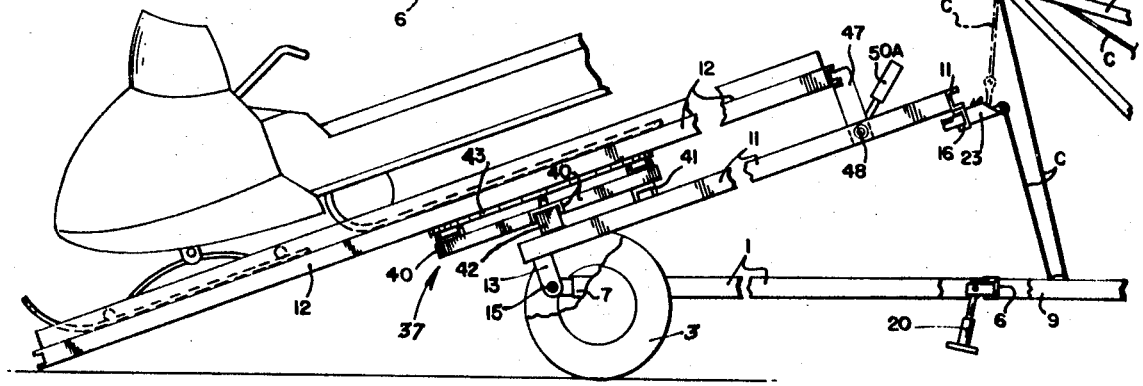
Fig. 5
INVENTOR.
ROY A. JENKINS
BY
*James A. Simon Jr.*
AGENT

PATENTED SEP 14 1971 3,604,579

INVENTOR.
ROY A. JENKINS
BY
AGENT

TRAILER FOR SNOW VEHICLES

BACKGROUND OF THE INVENTION

The present invention relates generally to trailers and more particularly to a trailer for the convenient loading and transport of powered snow vehicles.

Powered snow vehicles for recreational use, of the type carrying one or two occupants, have recently found popularity with a sizable segment of the public. Such vehicles are commonly termed snowmobiles and essentially include a powered continuous track element with steerable skis provided for directional control. The wide popularity of such vehicles has resulted in governmental agencies setting up and supervising recreational areas for their use. Such areas are necessarily remote requiring transport to and from of the snow vehicle. The considerable weight and size of the typical snowmobile requires that it be carried in a truck bed or flat bed type trailers with loading and off loading therefrom requiring considerable physical effort. Reversing means for backing snowmobiles are not ordinarily provided.

Currently it is the practice to transport the vehicles by use of pickup trucks or trailers with off and on loading usually being achieved in a makeshift; hazardous manner.

For example if a roadside bank of truck bed height can be found the truck bed may be backed against the bank whereupon the snowmobile may be manually pulled off onto the snow bank. Needless to say the physical effort required is considerable. This same situation exists for the most part when conventional trailers are used for transporting snowmobiles.

SUMMARY OF THE INVENTION

The instant invention is embodied within a trailer particularly directed toward the convenient loading, transporting and discharge of a snowmobile vehicle.

Important to the invention is a positionable bed to permit driving of the snowmobile both onto and off of the bed thus avoiding the arduous physical task of pushing or dragging the vehicle. Accordingly both loading and unloading operations are accomplished under the vehicle's own power.

Another important object of the invention is to provide a trailer wherein the bed is tiltable in a controlled manner by cable means. Associated with bed movement is the provision of pivot means for bed movement about a horizontal axis located medially of the trailer structure. Accordingly the snowmobile vehicles weight when evenly disposed does not present an obstacle to tilting movement of the trailer bed.

A further object resides in the provision of a rotatable trailer bed movable about an upright axis whereby the vehicle may be driven forwardly both onto and off of the bed. In view of the fact that presently snowmobiles may not be driven rearwardly or "backed up" this is a highly desirable feature.

Another object of the invention is to provide locking arrangements for the bed securely retaining same during loading and unloading operations as well as during transit. The aforementioned cable means may be utilized to provide additional locking of the bed during transport of the trailer.

BRIEF DESCRIPTION OF THE DRAWING

In the accompanying drawings:

FIG. 1 is a perspective view of the instant trailer shown detached from a towing vehicle with a pair of snowmobiles in place on the trailer bed for transport, FIG. 2 is a side elevational view of the trailer with fragments of a winching arrangement broken away with the bed reversed from the FIG. 1 position preparatory to unloading;

FIG. 3 is an enlarged detail view of the trailer structure encircled at 3 in FIG. 2 with fragments broken away, FIG. 4 is an elevational view taken along line 4—4 of FIG. 3 showing a locking arrangement, FIG. 5 is a view similar to FIG. 2 with the trailer bed inclined with the snowmobiles being unloaded.

DESCRIPTION OF PREFERRED EMBODIMENT

Figure 6:
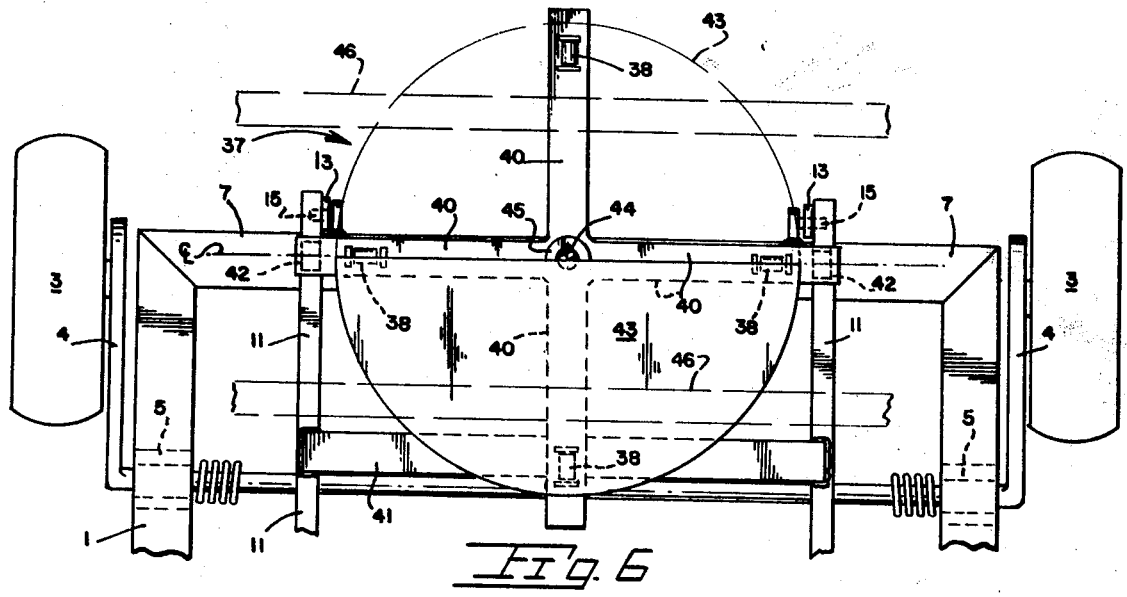
FIG. 6 is a horizontal sectional view taken downwardly along irregular line 6—6 of FIG. 2 and showing turntable construction.

With continuing reference to the accompanying drawings wherein reference numerals indicate parts similarly identified in the following specification the reference numeral 1 indicates a trailer frame provided at its forward end with a hitch member 2.

The frame of the trailer is supported adjacent its rearward end by wheels 3 which may be mounted by conventional trailer suspension including trailing arms 4 (FIG. 6) which are suitably journaled within bearings 5. The frame includes crossmembers with front and rear crossmembers at 6 and 7 respectively. A tongue portion at 8 is angularly braced at 9 and mounts bed lifting components later described.

A tiltable framework 11 is vertically spaced above the trailer frame 1 for tilting movement with the trailer bed indicated at 12. For such movement, the rearward end of framework 11 is hingedly supported by means of depending brackets 13, best shown in FIG. 6, the lower ends of which are journaled on hinge pins 15 mounted upon the frame 1. Accordingly tilting or inclined movement of the framework and bed is possible about the aligned transverse axis of the hinge pins 15.

As best viewed in FIGS. 3 and 4 the forward end of tiltable framework 11 subjacently mounts a channel section 16 for parallel spacing of the frame and tiltable framework. For locking the framework 11 in a position for trailer movement I provide a pivoted eyebolt 17 swingably carried by the front crossmember 6 of frame 1 as shown in FIG. 4. The eyebolt shank when swung upwardly is interposed between angle iron sections 18. In threaded engagement with the eyebolt shank is a collar 20 having a bearing plate 21 affixed to its lower end with a handgrip 22 oppositely located. With the eyebolt shank intermediate the angle sections 18 tightening of the collar will securely lock the tiltable framework 11 and its subjacent channel section 16 to the trailer frame. Projecting forwardly from the center of the channel section 16 is a socket 23 welded to the section and apertured to receive hook 25 insertable therein.

For raising and lowering framework 11 and the trailer bed 12 thereon bed positioning means indicated generally at 26 are provided. A conventional hand powered winch at 27 includes a gear reduction drive and ratchet to enable locking of the cable drum at 28 against paying out of the cable C. Obviously a hydraulic cylinder could be used if desired. Rigidly supporting the which is an upright stanchion 30 integral at its upper end with an arm 31 provided with a pulley 32 at its outer end. Both the stanchion 30 and the arm 31 are rigidly braced by members at 32–33. U-shaped clips 34, welded to the trailer tongue, receive the lower brace members and the lower end of the stanchion. The cable C is routed around pulley 32 and terminate in the hook 25 engageable with the socket 23 on the tilting framework. Affixed to the trailer tongue 8 is a fair-lead type device 35 around which the cable is also entrained to effect a downward pull on the table framework 11. For imparting an opposite or upward force on framework 11 the cable is disassociated from the fair-lead as seen in the broken line cable position of FIG. 5. The operation of the winch arrangement 26 is later described.

As aforementioned the trailer bed 12 is rotatably mounted upon the framework 11 for moving about an upright axis embodied within a turntable assembly such indicated generally at 37. With attention toward FIGS. 2 and 6 the assembly 37 comprises rollers 38 mounted upon intersection supports 40 with the latter in turn being secured upon the tiltable framework 11 by means of a transverse member 41 and spacer blocks 42.

Supported upon the rollers is a turntable plate 43 centrally attached to the underside of the trailer bed 12, and rotatable therewith. Centrally of the plate is a depending pivot shaft 44 for journaled engagement within a bearing 45 located within the intersection of the intersecting supports 40. Structural crossmembers of the bed 12 are typically shown at 46 and serve to subjacently mount the turntable 43 to the underside of the bed.

Figure 7:
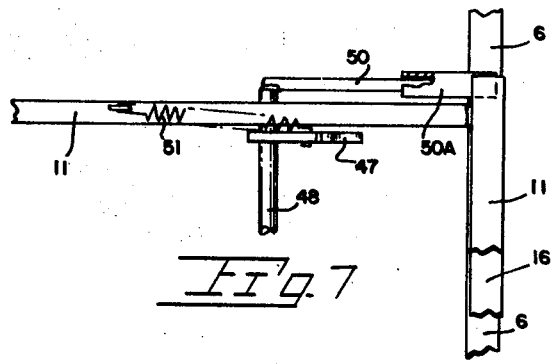
FIG. 7 is a horizontal plan view taken approximately along line 7—7 of FIG. 3 and showing bed retention means to hold the trailer bed against rotation.

Bed-retention means are carried by the tiltable framework 11 adjacent the forward end thereof and include a pair of swingable arms 47 mounted to the framework 11 by means of a shaft 48 extending transversely thereof. Shaft 48 is rockably mounted within longitudinally extending framework members and extends outward of one of said members (FIG. 7) to receive a lever 50. Springs at 51 bias the arms 47, and particularly a detent 47A therein, into engagement with the trailer bed 12. As shown in FIG. 3 the detents 47A engage the flange of end member 12A of the bed to retain the bed against movement about the turntable. Both ends of the trailer bed 12 carry like members 12A to permit locking of the bed in place in the reversed position shown. The lever 50 includes a slidable extension 50A permitting handle retention downward against the action of springs 51. Extension 50A is slidable forward for inserted engagement beneath a projecting end of the forward crossmember of the tiltable framework.

Trailer operation of the unloading of the snowmobiles from the FIG. 1 position includes the release of the bed retaining arms 47 by actuation of lever 50. Turntable rotation of the bed through 180° locates the snowmobiles in the FIG. 2 position whereupon the retaining arms 47 are again engaged with the bed 12. Ideally the center of gravity of the snowmobiles is in a common vertical plane with the rotational axis of the turntable. The cable C is slacked to permit disengagement from the fair-lead 35 whereupon an upward pull on the trailer bed 12 may be exerted by the reeled in cable, as shown in FIG. 5. The snowmobile while inclined may then be driven downwardly and off the trailer bed which is left inclined to receive the vehicle during loading. During loading the snowmobile is simply driven into place on the inclined bed and a clamping bar at 52 bolted in place over the ski members of the vehicle. With the snowmobile secured in place on the inclined bed 12 the winch is unlocked to permit restrained paying out of cable C to slowly lower the bed. The locking means for the framework 11 including the eyebolt 17 is swung upwardly into place whereupon tightening of sleeve 20 will securely lock the forward end of framework 11 and its subjacent channel member 16 to the frame of the trailer. An auxiliary lock is provided by rerouting of the cable beneath the fair-lead 35 to enable a downward pull to be exerted on the bed when the cable is tensioned.

Having thus described the present invention what I desire to secure under a Letters Patent is:

1. A trailer structure providing for convenient transport of snowmobiles, said trailer structure comprising,
a wheel supported frame,
a tiltable framework supported by said frame,
hinge means interconnecting said frame and framework permitting movement of the latter about a horizontal axis into an inclined tilted position relative to said frame,
a tiltable trailer bed carried by said framework and movable therewith into an inclined position for receiving and discharging a load,
turntable means mounted on said tiltable framework and tiltable therewith, said turntable means supporting said tiltable trailer bed permitting rotation of the latter for reversing the position of the tiltable bed to facilitate loading and unloading operations,
bed-retention means interengageable with said trailer bed and framework to restrain the trailer bed against rotational movement, and
locking means for retaining the bed against tilting movement during transport.

2. The trailer structure as claimed in claim 1 wherein the hinge means and turntable means are both located below the midportion of the trailer bed to support the latter and load thereon in a balanced manner to facilitate bed movement.

3. The trailer structure as claimed in claim 1 wherein said retention means is carried by said tiltable framework adjacent the forward end thereof for engagement with the forwardly located end of the trailer bed.

4. The trailer structure as claimed in claim 3 wherein said retention means comprises arms contactible with the bed at spaced apart points to prevent rotation thereof on said turntable.

5. The trailer structure as claimed in claim 4 wherein said arms are swingably mounted on a common shaft and are spring biased into trailer bed contact.

6. The trailer structure as claimed in claim 1 wherein bed positioning means are included for powered tilting movement of the trailer bed about said horizontal axis.

7. The trailer structure as claimed in claim 6 wherein said bed positioning means comprises a winch arrangement having a reeled cable for moving said trailer bed.

8. The trailer structure as claimed in claim 7 wherein said trailer frame mounts a fair-lead device about which the cable may be entrained to permit reversing the direction of the cable pull on the trailer bed to facilitate movement and positioning of the bed during loading and unloading operations.

9. The trailer structure as claimed in claim 1 wherein said locking means includes a locking member pivotally attached to said frame and movable into an upright position for locking engagement with the framework.

10. The trailer structure as claimed in claim 8 wherein said cable is provided at its end with a hook removable engageable with the trailer framework whereby upon said cable being entrained below the fair-lead device a downward pull may be exerted on the tiltable framework by said hook to retain the trailer bed in a lowered position for travel.